United States Patent [19]

Kauffman

[11] 4,351,734
[45] Sep. 28, 1982

[54] SPARK CELL OZONE GENERATOR

[75] Inventor: Gilbert Kauffman, Bethlehem, Pa.

[73] Assignee: Ametek, Inc., Paoli, Pa.

[21] Appl. No.: 942,864

[22] Filed: Sep. 15, 1978

Related U.S. Application Data

[63] Continuation of Ser. No. 792,543, May 2, 1977, abandoned.

[51] Int. Cl.$^3$ .............................. C02F 1/48; C02F 1/78
[52] U.S. Cl. ..................................... 210/748; 204/149;
 204/302; 210/760; 210/908; 210/192; 210/139;
 422/186.07
[58] Field of Search ............... 204/149, 151, 176, 302;
 210/15, 17, 42 R, 47, 50, 63 R, 63 Z, 192, 139,
 748, 760, 908; 250/532, 535, 538, 542

[56] References Cited

U.S. PATENT DOCUMENTS

| | | | |
|---|---|---|---|
| 767,195 | 8/1904 | Zerbe | 210/63 Z |
| 2,271,895 | 2/1942 | Hartman | 204/176 |
| 2,867,573 | 1/1959 | Wintermute | 204/164 |
| 3,445,001 | 5/1969 | Raus | 210/139 |
| 3,716,459 | 2/1973 | Salter et al. | 204/151 |
| 3,730,864 | 5/1973 | Tarjanyi et al. | 204/149 |
| 3,734,846 | 5/1973 | McNabney et al. | 204/176 |
| 3,915,822 | 10/1975 | Veltman | 204/149 |
| 3,919,062 | 11/1975 | Lundquist et al. | 204/149 |
| 3,975,247 | 8/1976 | Stralser | 210/62 |

OTHER PUBLICATIONS

Kirk-Othmer, *Encyclopedia of Chemical Technology*, vol. 14, pp. 420-422, 2nd Ed.

*Primary Examiner*—Peter A. Hruskoci
*Attorney, Agent, or Firm*—Ratner & Prestia

[57] ABSTRACT

A method of treating liquid waste with ozone by passing the liquid to be treated between complementary horizontal electrodes having therebetween electrically conductive particles so as to form an electrode bed, pulsing air simultaneously with said liquid, and maintaining between said electrodes an electrical potential so that as the air and liquid pass through said electrode bed, the bed expands to establish electrical contact between the electrodes thus to create localized arcing between particles in the bed and to form ozone.

11 Claims, 1 Drawing Figure

SPARK CELL OZONE GENERATOR

This is a continuation of application Ser. No. 792,543, filed May 2, 1977 now abandoned.

BACKGROUND OF THE INVENTION

The present invention relates to a method and apparatus of treating waste utilizing ozone that is produced by passing a stream of air and waste-containing liquid effluent through a cell containing a bed of conductive particles.

It is well known that the basic ozonator comprises a pair of elongated metal electrodes separated by an insulator. When a current of air is passed between electrodes and a high voltage alternating current is applied to the electrodes, ozone is formed. The reaction is expressed by the following electrochemical equation:

$$O_2 + e^- = 2O + e^-$$
$$O + O_2 + M = O_3 + M$$

where e is the initial electron charge generated and M is the available molecules of gas stabilizing the ozone molecule.

In the process, oxygen atoms are formed due to the collision of $O_2$ molecules with electrons, then some of these atoms attach themselves to the oxygen molecules. The excess energy of the newly formed ozone is carried off by any available molecules of gas (M) stabilizing the ozone molecule. The concentration of ozone in the gas stream is usually 1-2% by weight because of the competing ozone dissociation which destroys the ozone.

The dissociation of oxygen with subsequent formation of ozone may also be brought about by ultraviolet or gamma radiation.

U.S. Pat. No. 2,271,895 discloses an apparatus and method for treating liquids by the use of electric discharges in the presence of a liquid and a gas and/or vapor. The method requires the pre-saturation of the liquid with gas and the subsequent passing of the liquid in a thin film while subjecting it to electric discharge.

U.S. Pat. No. 2,867,573 discloses a method for the production of aqueous liquids having a high oxidizing potential for use in the treatment of waste liquors before they have passed into streams.

U.S. Pat. No. 3,975,247 discloses a process for treating sewage and recovering useful water and solids by passing waste fluid up and down between a plurality of electrode plates. In the process, ozone is generated and utilized for destroying odors and preventing bacterial and fungal growth.

Due to its stability, ozone must be removed from the generating equipment and injected into the stream to be treated with minimum delay. Since it has a low solubility in water it requires an elaborate contacting procedure in the treatment of waste. Ozone further presents a hazard in its production since it is highly poisonous. Additionally, use of ozone in a waste system that is introduced through a secondary source presents a distinct hazard if ozone leakage occurs.

SUMMARY OF THE INVENTION

The present invention relates to a method and apparatus for treating liquid waste with ozone that eliminates the necessity of separate ozone generating equipment and the need for the transfer of ozone into the reaction vessel. More particularly, the present invention relates to an apparatus in which ozone is generated in situ and immediately used in a liquid waste stream which is moving through the apparatus. The apparatus is provided with an inlet at its bottom in which air and influent may enter. In the reaction zone there is fixed at least one pair of horizontally disposed electrodes having therebetween a conductive packing through which the air and influent pass (hereafter sometimes called the electrode bed). The air and influent which have been treated are then removed by means of an outlet at the top of the apparatus. In the apparatus there is advantageously utilized a means for pulsing the air into the system.

According to the process of the present invention, influent or liquid waste is fed through the bottom of the ozone generating apparatus. The stream flows through an electrode bed and exits at the top of the apparatus. At the same time, air is pulsed through the bed in the same direction. Typical packing is 2-5 mesh aluminum shot of 99% Aloe Norite RB4 carbon. The air is broken up into many bubbles due to the tortuous path through the bed, and it, together with the upflowing liquid, expands the bed so that electrical contact is established between electrodes. The contact between the electrodes is continuously interrupted and re-established by movement of the bed due to air bubbles and liquid. Therefore, arcing occurs so that ozone is formed throughout the bed and is effectively utilized immediately by the influent.

Advantageously, the present apparatus does not require any additional cooling systems that are usually required because the generation of ozone is so energy intensive since the influent is sufficient for dissipating the heat.

The invention, as well as other objects and advantages thereof, will become more apparent from the following detailed description when taken together with the accompanying drawing.

DESCRIPTION OF THE PREFERRED EMBODIMENT

Figure 1:
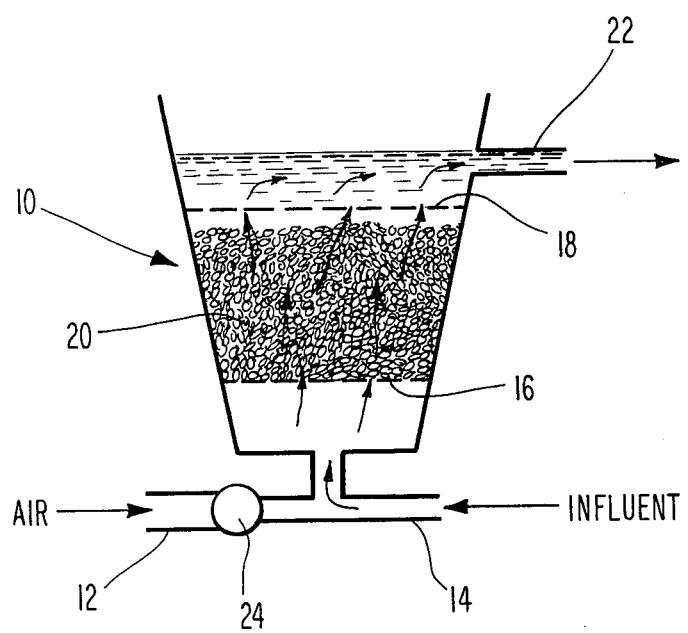
FIG. 1 is a flow diagram illustrating the steps of treating liquid waste in accordance with the present invention.

Referring now to the drawing, liquid having diluted fluids and solids in solution and suspension are fed from the bottom inlet 14 of the apparatus 10 that contains a pair of electrodes 16 and 18. An electrically conductive packing comprising material such as aluminum, or carbon or graphite particles or fragments may be utilized. The shape of the particles is not critical although the size and shape of the particles should be such that avoids the formation of channels.

It is further advantageous that the conductive packing does not totally fill the volume between the electrodes so as to provide for the expanded volume resulting from the upflowing liquid and bubbles if intermittent contact is to occur. Typical packing is 2-5 mesh aluminum shot of about 99% aluminum or Norite RB4 carbon.

The electrodes are preferably in a grid form that covers the entire cross-sectional area of the cell as shown in the drawing. Their construction is dependent upon whether an AC or DC potential is applied. Typically, with AC current, both electrodes are made of stainless steel. Also, the anode may consist of carbon, lead dioxide, magnetite, platinum, ruthenium oxide or coatings of these materials on supporting substrates such as titanium or tantalum.

At a position above the upper electrode is the discharge outlet 22, the discharged effluent is in such condition that it is re-usable in treating more waste and any excess water is available for other purposes, without fear of carrying over any harmful material from the wastes that were treated.

In the operation of the system, the effluent stream to be treated enters the apparatus 10 by means of inlet 14 and flows through the electrode 16, (which is negative when DC current is utilized), passes through the conductive packing 20, through electrode 18 and is discharged through outlet 22. At the same time that the influent stream is entering the apparatus 10, air is pulsed through inlet 12, such as through the utilization of a timer and solenoid valve 24, and continues its travel with the influent stream. Due to the tortuous path in the conductive packing 20, the air is broken up into many bubbles and it expands the bed so that electrical contact is established between the upper and lower electrodes. This contact is continuously interrupted and re-established by movement of the bed because of the air bubbles. Therefore, arcing occurs continuously throughout the entire bed. Since airlift moves the particles apart, the arcs that are created jump across the air gaps. Also, because the stream flows through the same tortuous path, very intimate mixing of the generated ozone and the stream occurs without a loss of ozone.

After treatment, the liquid passes through outlet 22 by way of overflow to be used as desired.

The device of the present invention can be used either with AC or DC circuit. When DC power is utilized the bottom electrode 16 functions as the cathode and electrode 18 functions as the anode.

It is advantageous in the present process to utilize a means such as a timer and solenoid for pulsing the air into the system since it would be possible to control the frequency of the arcing.

The following Examples illustrate the treatment of waste liquid utilizing the apparatus and process of the present invention:

EXAMPLE 1

Liquid laundry waste was passed through the apparatus shown in FIG. 1 of the drawing utilizing carbon as the conductive packing at a rate of 2.5 gallons per hour. The electrodes were connected across a direct current source at 150 volts and 6–10 amps.

Results

COD was reduced in one pass 81% (from 393 mg/l to 74 mg/l).

EXAMPLE 2

A waste solution containing the chemicals noted below as simulating a herbicide waste stream was passed into the apparatus shown in FIG. 1 of the drawing using aluminum as the conductive packing at a rate of 2 gallons per hour. The electrodes were connected across a direct current source at 7 volts and 10 amps.

Results

TABLE 1

|  | Analysis, ppm | | |
| --- | --- | --- | --- |
|  | Untreated | Neutralized | Effluent from cell |
| TOC (total organic carbon | 695 | 490 | 160 |
| Diethyl disulfide | 15 | 0.4 | ND* |
| Ethyl propyl disulfide | 40 | 0.2 | ND |
| Dipropyl disulfide | 22 | 0.2 | ND |
| Diisopropyl disulfide | 1 | ND | ND |
| Herbicide #1 (residual) | 260 | 19 | ND |
| Herbicide #2 (residual) | 3 | 0.3 | ND |

*ND—non-detectable

EXAMPLE 3

Filtered raw sewage was passed through the apparatus shown in FIG. 1 of the drawing utilizing carbon as the conductive packing at a rate of 5 gallons per hour. The electrodes were connected across an alternating current source at 50 volts and 1–2 amps.

Results

COD was reduced in one pass by approximately 50% (from 2638 mg/l to 1390 mg/l).

It should be understood that the apparatus and means herein disclosed are by way of illustration only, and must not be construed as limiting the invention in any way. It is further understood that the term "air" is meant to include other gases, especially oxygen and oxygen containing gases. It is obvious that many variations may be employed without departing from the spirit of the invention.

I claim:

1. In an apparatus having a chamber with an inlet and outlet for treating liquids with ozone, the improvement which comprises electrode means vertically spaced and horizontally disposed within said chamber, an expandable bed of electrically conductive particles disposed substantially throughout the space between said electrode means, said electrically conductive particles forming tortuous paths throughout, said fluid inlet means being located at the bottom portion of said chamber and said fluid outlet means being located at the top portion of said chamber for passage of the liquid upward through said chamber, said particles and said outlet, means for applying an electrical potential between said electrodes and for producing arcing in air spaces between said particles, and means for passing air upwardly through said particles along with said fluid in a manner adapted to expand said particle bed and thereby establish intermittent electrical contact between said electrodes and to cause arcing in air spaces between particles thereby to form ozone.

2. The apparatus of claim 1, wherein said electrically conductive particles are aluminum or carbon.

3. The apparatus of claim 1, wherein said electrodes are in grid form.

4. The apparatus of claim 1, including means for producing intermittent contact between the particles of said expandable bed, said means comprising means for pulsing said upwardly flowing air introducing means.

5. The apparatus of claim 4, wherein said means for pulsing the air is a timer and a solenoid.

6. A method of treating a liquid with ozone which comprises:
 (a) passing the liquid to be treated upwardly between complementary spaced horizontal electrodes having therebetween an expandable bed of electrically conductive particles,
 (b) simultaneously passing pulses of air upwardly with said liquid through said bed, said pulsed air forming bubbles in said liquid,
 (c) establishing between said electrodes an electrical potential, said upwardly flowing liquid and pulsed air expanding said bed upwardly in a pulsed manner causing intermittent contact between the particles of said bed and said electrodes, said electrical potential being sufficient to create arcing between said particles and across said air bubbles and thereby converting oxygen to ozone therein, said ozone thus being dispersed as it is formed throughout said liquid to effect treatment thereof.

7. The method of claim 6 wherein said electrodes are connected across an alternating current source.

8. The method according to claim 6 wherein said electrodes are connected across a direct current source.

9. A method, as recited in claim 6, wherein said liquid is water containing oxidizable contaminants.

10. A method, as recited in claim 6, wherein said liquid is filtered raw sewage.

11. A method, as recited in claim 6, wherein said liquid is an aqueous waste stream containing herbicide residue.

* * * * *